Figure 1:
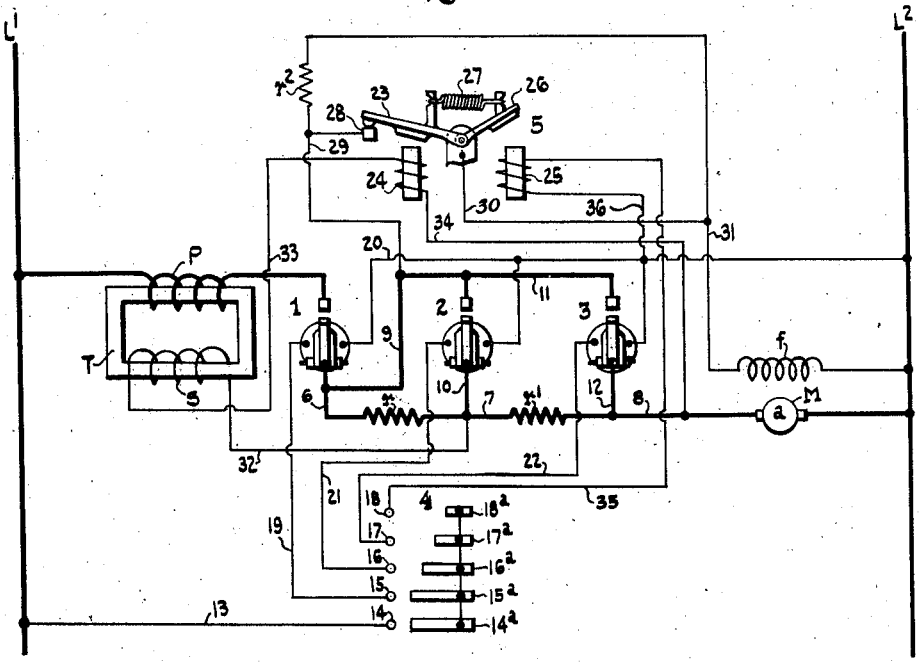

Oct. 10, 1933.  C. W. KUHN  1,929,745
MOTOR CONTROLLER
Filed Aug. 2, 1928

INVENTOR
Clarence W. Kuhn.
BY
ATTORNEY

Patented Oct. 10, 1933

1,929,745

UNITED STATES PATENT OFFICE 1,929,745

MOTOR CONTROLLER

Clarence Wilbur Kuhn, North Milwaukee, Wis., assignor, by mesne assignments, to Cutler-Hammer, Inc., Milwaukee, Wis., a corporation of Delaware Application August 2, 1928. Serial No. 296,905

5 Claims. (Cl. 172—179)

This invention relates to improvements in motor controllers.

More particularly the invention relates to controllers providing for acceleration of direct current motors subject to inductive delay as a function of changes in the motor current.

Such controllers have heretofore been provided with one or more accelerating switches, each upon response effecting and maintaining a given resistance communication, and the present invention has among its objects to provide a controller affording acceleration subject to inductive delay through the medium of a vibrating accelerating relay.

A further object is to provide such a controller readily adaptable for acceleration through the medium of either armature or field resistance.

Other objects and advantages of the invention will hereinafter appear.

The accompanying drawing illustrates diagrammatically certain embodiments of the invention which will now be described, it being understood that the invention may be embodied in other forms without departing from the scope of the appended claims.

Figure 2:
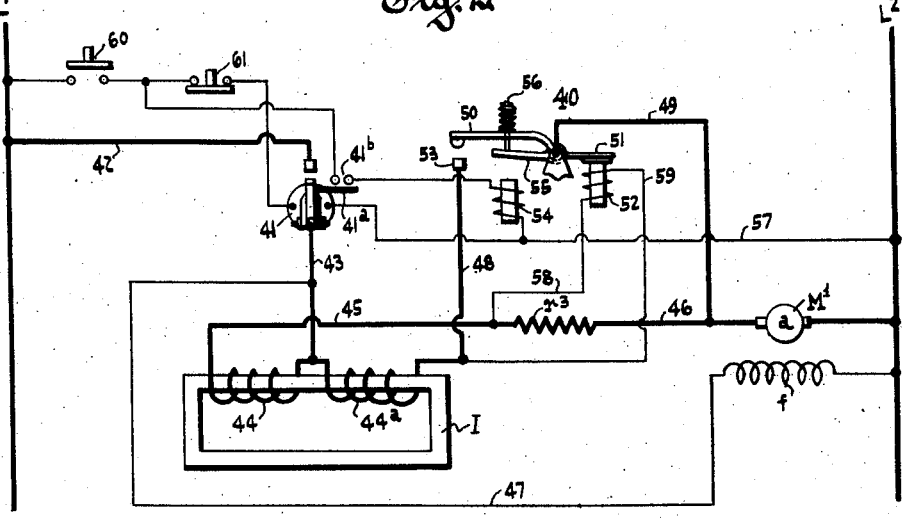

In the drawing,

Figure 1 illustrates a controller for effecting acceleration through the medium of field resistance, while Fig. 2 illustrates a controller for effecting acceleration through the medium of armature resistance.

Referring to Fig. 1, the same illustrates a direct current motor M having an armature $a$ and a shunt field $f$ to be supplied from lines $L^1$ $L^2$, and to be controlled through the medium of armature resistances $r$ and $r^1$ and a field resistance $r^2$.

The control instrumentalities illustrated comprise an electroresponsive main switch 1, electroresponsive switches 2 and 3 for respectively short-circuiting armature resistances $r$ and $r^1$, a drum type master switch 4 controlling the aforementioned switches, a vibrating relay 5 to control the field resistance $r^2$, and a transformer T to influence said relay.

The switches 1, 2 and 3 control the armature circuit in a well known manner, switch 1 upon closure completing circuit from line $L^1$ through the transformer primary winding P by conductor 6 through resistance $r$ by conductor 7 through resistance $r^1$ by conductor 8 through the motor armature to line $L^2$, whereas switch 2 completes a short-circuit for resistance $r$ extending from conductor 6 by conductors 9 and 10 to conductor 7 and switch 3 completes a short-circuit for resistance $r^1$ extending from switch 2 by conductors 11 and 12 to conductor 8.

Also, the switches 1, 2 and 3 are controlled in a well known manner, the drum 4 providing for energization of said switches progressively. More particularly, the drum in its first position completes circuit from line $L^1$ by conductor 13, contact 14, segments $14^a$—$15^a$, contact 15 and conductor 19 to and through the winding of switch 1 by conductor 20 to line $L^2$, whereas said drum in its second position completes circuit through its contacts 16—$16^a$ by conductor 21 through the winding of switch 2 to conductor 20, and in its third position completes circuit through its contacts 17—$17^a$ by conductor 22 through the operating winding of switch 3 to conductor 20. It is, of course, to be understood that the switches 1 to 3 might be provided with the usual interlocks and with any one of a number of means for affording delayed acceleration, such provisions having been omitted for simplicity of illustration.

The relay 5 comprises a pivoted contact element 23 constituting the armature of an electromagnet 24, an electromagnet 25 having an armature 26 shown as supported on the pivot of contact arm 23, a tension spring 27 connecting the contact element 23 and armature 26 and a contact 28 to be engaged by contact element 23.

The contact element 23 is biased by gravity into engagement with contact 28 to complete the field circuit of the motor, said circuit being traceable from main switch 1 by conductors 9 and 29 through said contacts of relay 5 by conductors 30 and 31 through the field $f$ to line $L^2$. Disengagement of contacts 23 and 28 inserts resistance $r^2$ in the field circuit of the motor between conductors 9, 29 and 31.

The electromagnet 24 of relay 5 is connected across armature resistance $r^1$ in series with the secondary S of transformer T, circuit being traceable from a point between resistances $r$ and $r^1$ by conductor 32 through transformer winding S by conductor 33 through said electromagnet by conductor 34 to a point between resistance $r^1$ and the motor armature. Accordingly electromagnet 24 is energized upon initial completion of the motor circuit and when energized supplements the action of gravity to retain the relay contacts in engagement, the winding 25 being deenergized pending movement of the master drum into its final position.

When the master drum is moved into its final position it completes circuit through its contacts 18—$18^a$ by conductor 35 through the winding of electromagnet 25 by conductors 36 and 20 to line L², thereby energizing said electromagnet to attract its armature 26 for tensioning spring 27. Thus energization of the electromagnet 25 and consequent tensioning of spring 27 tends to disengage the contacts of relay 5 for inclusion of the field resistance $r^2$, but after the electromagnet 24 has been energized it holds the relay contacts engaged until armature resistance $r^1$ is excluded and for an interval thereafter, owing to the fact that when it is short-circuited with the resistance $r^1$ current continues to flow therethrough due to the inductance of the circuit including the same and the transformer secondary winding S. Moreover, exclusion of resistance $r^1$ results in a sudden increase in armature current and this increase in armature current which flows through the primary of the transformer induces therein a magnetic flux which in turn induces an additional current in the secondary of the transformer and the electromagnet 24. A strong magnetic pull is thus induced in the electromagnet 24, with the aforementioned result that the relay contacts are maintained in engagement against the tension of spring 27 so long as this induced current has an appreciable value.

When the current induced in coil 24 decreases to a given value the relay contacts are disengaged by spring 27, thereby including the resistance $r^2$ in the motor field circuit and accelerating the motor. In consequence of this field weakening of the motor a second transient effect is produced in the armature circuit and in the secondary of the transformer, thereby again inducing a current in the coil S, which current flows through the electromagnet 24, causing it to again attract contact element 23 to short-circuit the field resistance $r^2$ and strengthen the field of the motor.

Thus is produced a vibrating action of the relay 5 which continues until the transient current flowing through the armature upon the insertion of the resistance $r^2$ in the field circuit has been so reduced that the relay remains open under the influence of electromagnet 25, whereupon the motor is caused to run at maximum speed.

Referring to Fig. 2, the same shows a slightly modified relay 40 for controlling a resistance $r^3$ in the armature circuit of a motor M¹. The motor M¹ has an armature $a$ adapted to be connected across lines L¹ L² through resistance $r^3$ by an electroresponsive main switch 41.

Closure of main switch 41 completes circuit from line L¹ by conductors 42 and 43 through winding 44 of an inductance I by conductor 45 through resistance $r^3$ by conductor 46 through the motor armature to line L². Also, closure of the main switch completes circuit from conductor 43 by conductor 47 through shunt field $f$ of motor M¹ to line L². The relay 40 in turn completes circuit from the main switch by conductor 43 through winding 44ª of inductance I by conductors 48 and 49 directly to the motor armature, thereby short-circuiting resistance $r^3$ and winding 44.

The relay 40 has a pivoted contact element 50 provided with a tail piece 51, forming the armature of an electromagnet 52, said contact element being engageable with a contact 53 being biased by gravity to disengage said contact. Further, the relay 40 is provided with an electromagnet 54 having an armature 55 mounted on the pivot of contact element 50 and having a resilient connection 56 with said element. The arrangement is such that when electromagnet 54 is energized to attract its armature it acts through the resilient connection 56 to bias contact element 50 toward contact 53.

The electromagnet 54 is adapted to be included in circuit upon closure of main switch 41. More particularly, said main switch through its auxiliary contacts 41ª and 41ᵇ completes circuit from line L¹ to and through the winding of electromagnet 54 by conductor 57 to line L². Also, electromagnet 52 is energized upon closure of the main switch and acts to restrain contact element 50 against movement. The winding of electromagnet 52 is connected on one side by conductors 58 and 45 to the left hand terminal of the inductance winding 44 and on its other side by conductor 59 to the right hand terminal of inductance winding 44ª. In consequence the initial inrush of armature current flowing through winding 44 induces a current in winding 44ª which current passes through electromagnet 52 and is of such magnitude as to cause said electromagnet to attract its armature with the result aforementioned.

On the other hand, after the induced current in the closed loop including the electromagnet 52 dies down, the armature 51 is released, thereby permitting closure of relay 40 to short-circuit resistance $r^3$. This in turn causes an inrush of current in the motor circuit and the voltage induced in windings 44 and 44ª as a result thereof renews the supply of current to electromagnet 52 for attraction of armature 51 and reopening of the relay to reinclude resistance $r^3$.

This vibratory action of the relay 40 is continued until the motor has accelerated, whereupon the relay remains closed for exclusion of resistance $r^3$.

Push button switches 60 and 61 provide for starting and stopping the motor at will through energization and deenergization of main switch 41 in a well known manner.

What I claim as new and desire to secure by Letters Patent is:

1. The combination with a direct current motor, of an accelerating relay therefor normally in a position corresponding to a low motor speed, said relay having means responsive to induced transient currents produced by varying currents in the circuit of said motor to bias it toward normal position, and having means rendered effective by completion of the motor circuit to bias it towards another position.

2. The combination with a direct current motor, of an accelerating relay therefor having a winding which when energized subjects it to a bias toward a given position and having a second winding to be energized to operate it against such bias, and means to subject the latter winding to induced transient currents for vibratory action of said relay.

3. The combination with a direct current motor, of an accelerating relay therefor comprising two electromagnets, armatures therefor, a resilient connection between said armatures and a contact associated with one of said armatures, one of said electromagnets being energizable to tension said connection for bias of said contact in one direction and the other of said electromagnets being energizable to effect operation of said contact against its bias, and means to subject the latter winding to induced transient currents for vibratory action of said relay.

4. The combination with a direct current motor having a shunt field, a resistance for the shunt field circuit of said motor, a relay for controlling said resistance, said relay having a plurality of control windings and being biased to short-circuit said resistance when said windings are deenergized, means to energize one of said windings to bias said relay to include said resistance in circuit and means to subject another of said windings to induced transient currents for vibratory action of said relay to accelerate said motor.

5. The combination with a direct current motor, an armature resistance therefor, a control relay for said resistance having a plurality of control windings, one being energized to hold said relay in a position to short-circuit said resistance subject to operation by another of said windings for inclusion of said resistance and an inductance in circuit with said motor and said second mentioned winding to supply the latter with transient currents for vibratory action of said relay to accelerate said motor.

CLARENCE WILBUR KUHN.

CERTIFICATE OF CORRECTION.

Patent No. 1,929,745.  October 10, 1933.

CLARENCE WILBUR KUHN.

It is hereby certified that error appears in the printed specification of the above numbered patent requiring correction as follows: Page 1, line 10, for "communication" read commutation; and that the said Letters Patent should be read with this correction therein that the same may conform to the record of the case in the Patent Office.

Signed and sealed this 23rd day of January, A. D. 1934.

F. M. Hopkins
Acting Commissioner of Patents.

(Seal)